(12) United States Patent
Wald et al.

(10) Patent No.: US 9,990,425 B1
(45) Date of Patent: Jun. 5, 2018

(54) PRESENTING SECONDARY MUSIC SEARCH RESULT LINKS

(71) Applicant: Google LLC, Mountain View, CA (US)

(72) Inventors: Gideon Wald, San Francisco, CA (US); Jeromy William Henry, Aptos, CA (US); Kavi J. Goel, San Francisco, CA (US); Jack W. Menzel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 14/834,201

(22) Filed: Aug. 24, 2015

Related U.S. Application Data

(63) Continuation of application No. 13/586,725, filed on Aug. 15, 2012, now Pat. No. 9,128,993.

(60) Provisional application No. 61/523,827, filed on Aug. 15, 2011.

(51) Int. Cl.
*G06F 17/30* (2006.01)

(52) U.S. Cl.
CPC .... *G06F 17/30769* (2013.01); *G06F 17/3053* (2013.01); *G06F 17/30755* (2013.01); *G06F 17/30867* (2013.01)

(58) Field of Classification Search
CPC ................................................. G06F 17/30755
See application file for complete search history.

(56) References Cited

U.S. PATENT DOCUMENTS

2004/0088328 A1* 5/2004 Cook ................ G06F 17/30038
2011/0015996 A1 1/2011 Kassoway et al.
2011/0283236 A1 11/2011 Beaumier et al.

* cited by examiner

*Primary Examiner* — Ajith Jacob
(74) *Attorney, Agent, or Firm* — Fish & Richardson P.C.

(57) ABSTRACT

Methods, systems, and apparatus, including computer programs encoded on computer storage media, for presenting secondary music search result links. In one aspect, a method includes receiving a search query. A plurality of search results that satisfy the search query are obtained. A presentation of the plurality of search results is generated, wherein a particular search result includes one or more secondary music search result links to respective music resources identified by markup language music data in a set of identified music web pages. The presentation of search results is provided in response to the search query.

21 Claims, 3 Drawing Sheets

PRESENTING SECONDARY MUSIC SEARCH RESULT LINKS

CROSS-REFERENCE TO RELATED APPLICATIONS

This application is a continuation of, and claims priority to, pending U.S. patent application Ser. No. 13/586,725, filed on Aug. 15, 2012, entitled "Presenting Secondary Music Search Result Links," which in turn is a non-provisional application claiming priority to provisional U.S. Patent Application No. 61/523,827, filed on Aug. 15, 2011, entitled "Presenting Secondary Music Search Result Links" The disclosure of the foregoing applications is incorporated herein by reference in its entirety.

BACKGROUND

This specification relates to Internet search engines, and more particularly to presenting search results that are identified as being responsive to search queries.

SUMMARY

Search systems identify Internet-accessible resources and provide corresponding search results in response to search queries. Music web pages can provide markup language music data that can be read by a search system so that the search system can include additional information along with search results for such music web pages. In particular, one or more secondary music search result links can be included with a particular search result, each secondary music search result link identifying or linking to a resource, e.g., a web page or a downloadable audio file, from which music content can be accessed.

In general, one innovative aspect of the subject matter described in this specification can be embodied in methods that include the actions of receiving a search query; obtaining a plurality of search results that satisfy the search query; determining that a particular resource corresponding to a particular search result of the plurality of identified search results has an entry in a set of identified music web pages, wherein a music web page includes markup language music data identifying respective music resources from which music content can be accessed, and wherein each entry in the set of identified music web pages is associated with music data identifying one or more songs, wherein music data for each song is defined by corresponding markup language code from a corresponding music web page; determining that the particular search result will include one or more secondary music search result links to respective music resources; generating a presentation of the plurality of search results, wherein each search result in the presentation includes a title, a snippet, and a link to a network resource, including generating for the particular search result of the plurality of search results one or more secondary music search result links to respective music resources identified by music data associated with the particular search result in the set of identified music web pages; and providing the presentation of search results in response to the search query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The set of identified music web pages are stored in a database of music data, wherein the database stores a set of identified music web pages and one or more elements of associated music data. The music data includes an artist name, an album name, and a song duration. The music content is an audio resource or a video resource. Each secondary music search result link presents a title of a song. Determining that the particular search result will include one or more secondary music search result links to respective music resources comprises determining that no more than a threshold number of search results include secondary music search result links. Determining that the particular search result will include one or more secondary music search result links to respective music resources comprises determining that no other types of secondary search result links will be included with the particular search result. Determining that the particular search result will include one or more secondary music search result links to respective music resources comprises determining that a quality measure of a corresponding secondary music search result links satisfies a threshold. The quality measure is based at least in part on a popularity of a song corresponding to a secondary music search result. The actions include parsing network resources that include markup language music data; and storing the music data in the database.

Particular embodiments of the subject matter described in this specification can be implemented so as to realize one or more of the following advantages. Providing secondary music search result links aids users in finding and discovering music content. Providing secondary music search result links enhances the information presented on a search results page.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
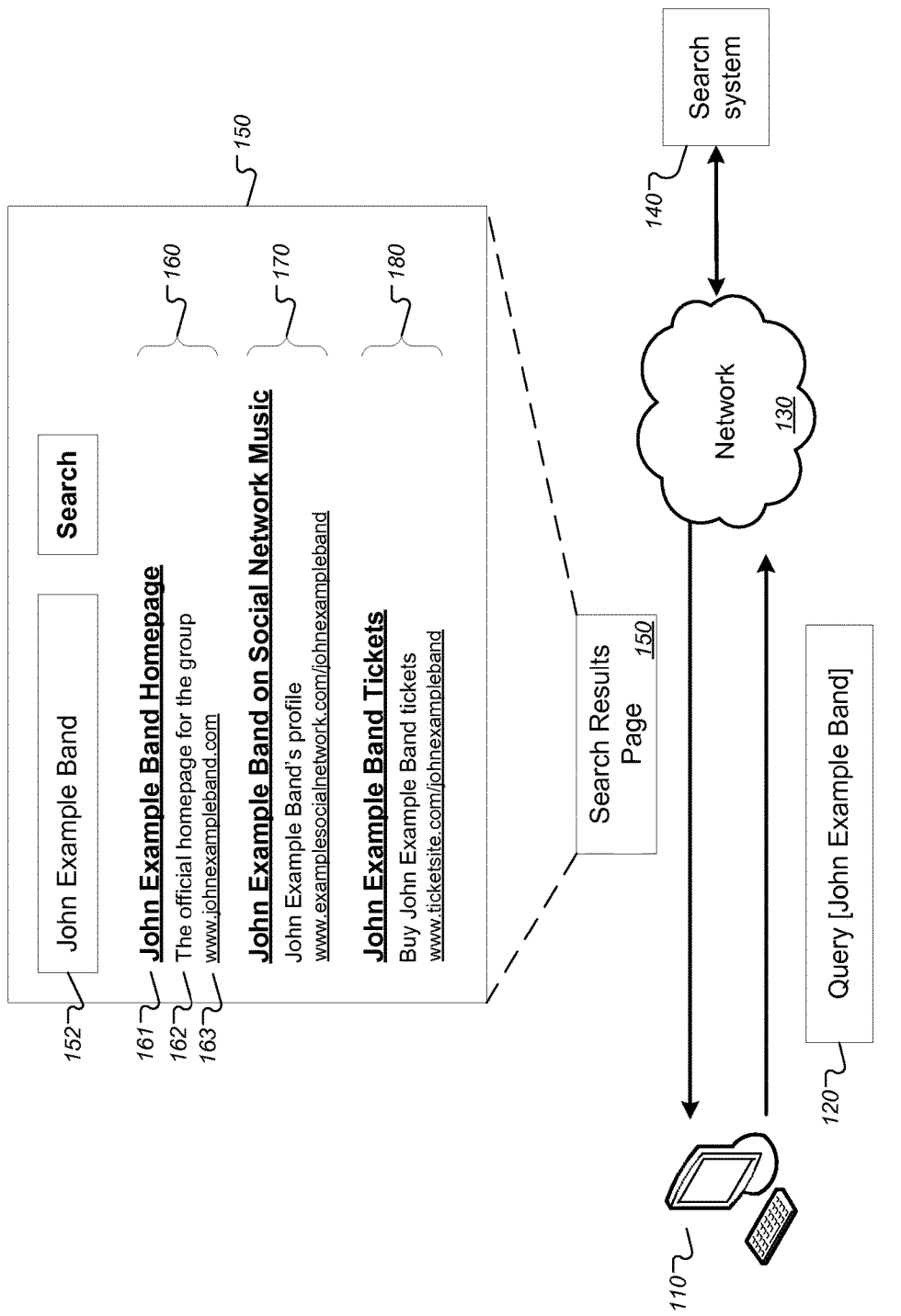
FIG. 1 illustrates an example search results page provided by an example prior art search system.

FIG. 1 illustrates an example search results page 150 provided by an example prior art search system 140. The search system 140 is an example of an information retrieval system in which the systems, components, and techniques described below can be implemented.

A user device 110 can be coupled to the search system 140 through a data communication network 130. In general, the user device 110 transmits a query 120 over the network 130 to the search system 140. The search system 140 identifies indexed resources that satisfy the query 120 and generates a search results page 150. The search system 140 transmits the search results page 150 over the network 130 back to the user device 110 for presentation to a user. Generally, the user is a person.

The user device 110 can be any appropriate type of computing device, e.g., a server, mobile phone, tablet computer, notebook computer, music player, e-book reader, laptop or desktop computer, PDA (personal digital assistant), smart phone, or other stationary or portable device, that includes one or more processors for executing program instructions and memory. The user device 110 can include computer readable media that store software applications, e.g., a browser or layout engine, an input device, e.g., a keyboard or mouse, a communication interface, and a display device.

The network 130 can be, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of such networks.

The search system 140 can be implemented as computer programs installed on one or more computers in one or more locations that are coupled to each other through a network, e.g., network 130. The search system 140 includes an index of resources and a search engine.

When the query 120 is received by the search system 140, a search engine identifies resources that satisfy the query 120. The search engine will generally include an indexing engine that indexes resources, e.g., web pages, images, or news articles on the Internet, and a ranking engine to rank the resources that have been identified. The indexing and ranking of the resources can be performed using conventional techniques.

The search system 140 responds to the query 120 by generating a search results page 150, which is transmitted over the network 130 to the user device 110 in a form that can be presented on the user device 110, e.g., as displayed in a web browser on the user device 110. For example, the search results page 150 can be a markup language document, e.g., HyperText Markup Language or eXtensible Markup Language document. The user device 110 renders the document, e.g., using a web browser, in order to present the search results page 150 on a display device. The user device 110 can also display the terms of the query in a query box 152 or "search box", located, for example, on the top of the search results page 150.

The search results page 150 generally presents multiple search results 160, 170, and 180. Each of the presented search results can include titles, text snippets, images, links, reviews, or other information. For example, the search result 160 includes a title 161, a snippet 162, and a display link 163.

Each search result 160, 170, and 180 is displays a link to a particular resource. Selection of one of the search results 160, 170, or 180, e.g., by a click, causes a display program running on the user device 110 to navigate to the resource associated with the search result identified by the display link 163.

Figure 2:
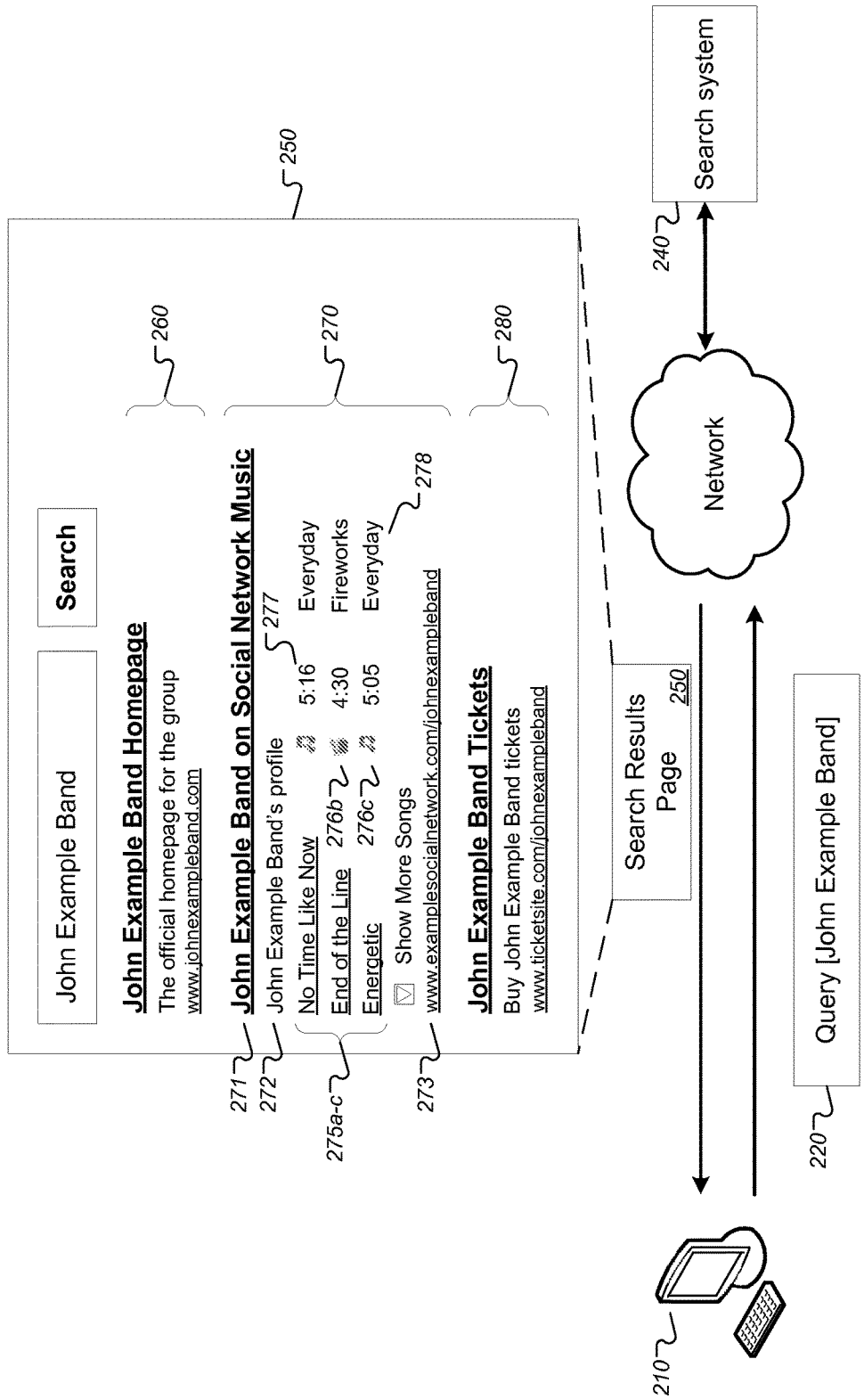
FIG. 2 illustrates an example search results page with secondary music search result links.

FIG. 2 illustrates an example search results page 250 that includes secondary music search result links 275a-c. The search results page 250 can be provided by a search system when an identified search result is linked to a music web page that provides markup language music data.

The search results page 250 includes search results 260, 270, and 280. Search result 270 includes a title 271, a snippet 272, and a display link 273. Search result 270 also includes secondary music search result links 275a-c. Selection of a secondary music search result link causes a display program running on the user device, e.g., a web browser, to navigate to a music resource. Music resources include resources from which music content can be accessed. The music content can include embedded, streaming, or downloadable audio and video. For example, selection of the secondary music search result link 275a "No Time Like Now" causes a display program running on the user device 210 to navigate to a resource where streaming audio of the song "No Time Like Now" can be accessed by, e.g., a user of the user device 210.

The provided secondary music search result links can include any of a number of music data elements, including a title, artist name, album name, duration, year of release, a link to an image of album cover art, keywords, awards, ratings, relevant URLs for, e.g., artist websites, in addition to many others. Each illustrated secondary music search result link 275a-c includes the song duration 277 and album name 278. Each illustrated secondary music search result 275a-c also includes an icon that identifies the type of file available from the corresponding music resource. For example, secondary music search result link 275b includes an icon 276b indicating that the available data is video data. Secondary music search result link 275c includes an icon 276c indicating that the available data is streaming audio data.

Music data presented in secondary music search result links can be obtained from web pages that serve resources including markup language music data. In some implementations, the markup language music data is not presented or rendered on the user device, and is rather served on web pages only to be parsed and used by the search systems, e.g., search system 240.

A markup language is a convention for annotating text by syntactically distinguishable elements called tags. Tags identify a property of the marked-up text. Tags can themselves include further data called attributes. The following example XML snippet identifies a song title and artist with corresponding tags:

<song>
<title>No Time Like Now</title>
<artist>John Example Band</artist>
</song>

Music data can also be specified by other kinds of markup, including HTML5 microdata in HTML documents. HTML5 microdata can be used to annotate text, on a website, for example, with name-value pairs that are referred to as properties. For example, a song name can be specified by the following example HTML5 code:

<div itemprop="song" itemscope>
<span itemprop="title">No Time Like Now</span>
<span itemprop="artist">John Example Band</span>
</div>

The first itemprop attribute indicates a property of "song" for a particular document division identified by the "<div>" tag. The itemscope attribute indicates the beginning of a group of name-value pairs. Each name-value pair is specified by further itemprop attributes, including the name "title" and the value "No Time Like Now," as well as the name "artist" and the value "John Example Band."

A search system can parse the markup language code, e.g. XML or HTML5, to obtain music data provided in a particular resource, e.g. a web page. The search system can then store the music data, including, for example, the song title and artist, as appropriate for generation and presentation as secondary music search result links.

Figure 3:
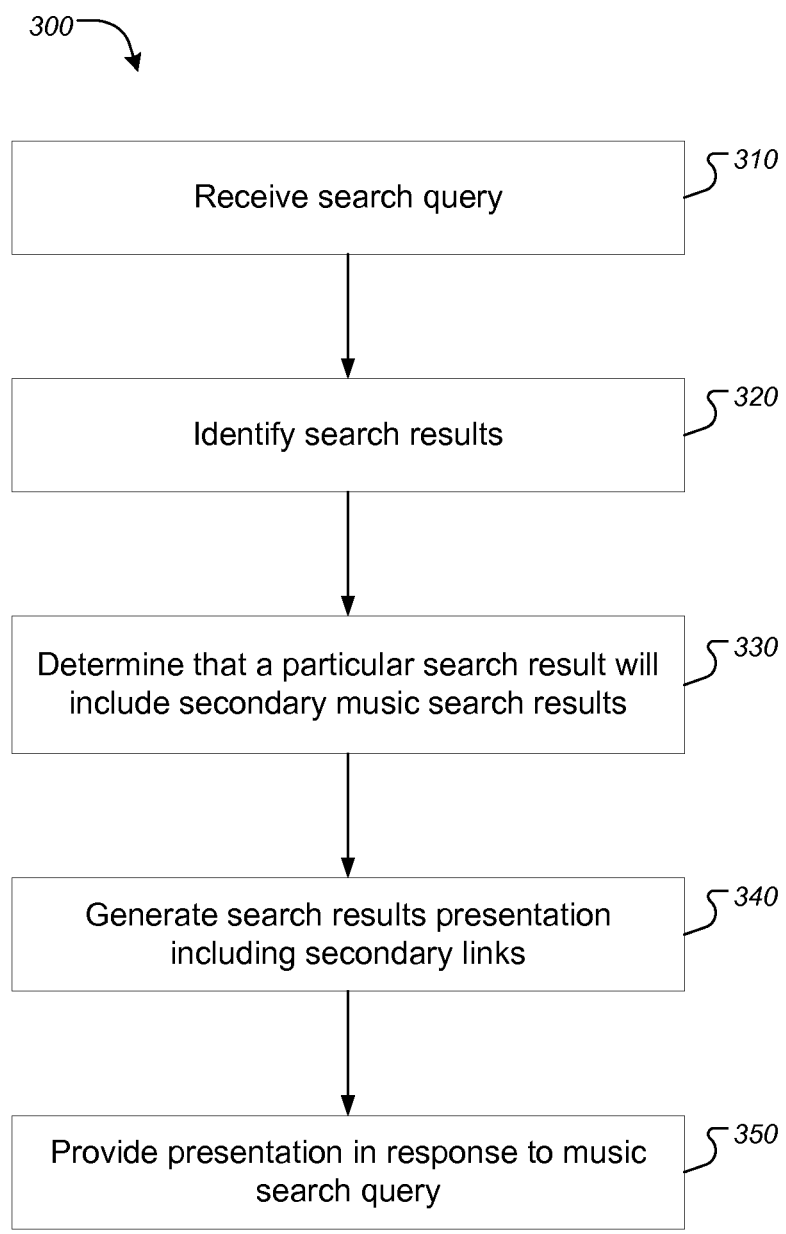
FIG. 3 is a flow chart of an example process for presenting secondary music search result links in response to a search query.

FIG. 3 is a flow chart of an example process 300 for presenting secondary music search result links in response to a search query. The process 300 can be implemented by one or more computer programs installed on one or more computers. The process 300 will be described as being performed by a search system, for example, the search system 240 of FIG. 2.

The system receives a search query (310). The search query can, for example, be received over a network from a user device.

The system obtains search results (320), for example, from a search engine subsystem. The search engine subsystem can identify resources that satisfy the search query from a database of indexed resources. Each search result identifies a resource having a particular network address, e.g., a URL.

The system determines that a particular search result will include secondary music search result links (330). The system can determine that a particular search result should include secondary music search result links from a previously built and maintained database of data from music web pages that have provided markup language music data. The database can store a set of key-value pairs, where the key is the network address of a resource, and the value is one or more elements of corresponding music data provided by the resource. The database of music data can be built and updated by crawling and parsing resources on a network, e.g., the Internet, by an indexing engine of a search engine, and organizing the data in a suitable form of database. If a resource identified by a particular search result has a corresponding entry in the database of music data, the system can determine that the particular search result will include one or more secondary music search result links that include at least some of the music data stored in the corresponding database entry.

The system can also apply additional criteria for determining whether the particular search result will include secondary music search result links. For example, the system can limit the number of search results on a search results page that include secondary music search result links. Thus, if a maximum number of search results that include secondary music search result links already exist, the system can omit secondary music search result links from a particular search result, even if the particular search result would otherwise include secondary music search result links.

The system can also determine not to present secondary music search result links when other types of secondary search result links are present on the search results page. For example, the search system can determine to present secondary search result links for categories other than music, for example, events and people. If a particular search result or other search results on the search results page already include other types of secondary search result links, the system can omit secondary music search result links from the particular search result even if the particular search result would otherwise include secondary music search result links. Alternatively, the system can determine to present secondary music search result links when search results identifying rich media, e.g. videos or streaming audio, are presented on the search results page.

The system can also impose a quality threshold on a particular secondary music search result link before including the particular secondary music search result link with a search result. For example, a relevance measure of a resource identified by a secondary music search result for a particular query can be taken into account when determining whether the secondary music search result link will be included. If the measure does not satisfy a threshold, the system can omit the secondary music search result link for the search result. Similarly, the system can also impose a threshold on the search result itself. If a particular search result does not satisfy a quality threshold, the system can omit the particular secondary music search result link from the search result.

Other quality thresholds can optionally also be used. For example, the system can also determine a measure of popularity of music content in a music database, for example, or a view count of particular videos. The system can then generate secondary music search result links corresponding only to songs that satisfy a popularity threshold. The popularity can also be determined using query popularity. For example, if a query does not satisfy an overall popularity threshold, the system can determine not to present any secondary music search result links in response to the query.

The system can also determine to present secondary music search result links only when the query is a music query. In some implementations, the system determines that the query is a music query by checking a whitelist of music queries. In other words, if the query does not appear on the whitelist of music queries, the system can determine not to present secondary music search result links.

The system can also determine whether the query is a music query using one or more signals. For example, the system can analyze query logs that store previously-received queries and search results provided in response. The system can analyze each of a number of the top-ranked search results, e.g., top 10 results, from the query logs to determine whether the search result is a music search result. A search result can be classified as a music search result if the search result identifies a resource from which music content can be accessed. The system then determines whether a threshold number or fraction of the top-ranked search results are music search results. If not, the query is not considered a music query. The system can also provide the signals to a linear classifier that has been trained using supervising machine learning to determine whether the query is a music query from the signals. One example signal is a classification of the terms of the query. For example, the system can submit the terms of the query to a classifier that classifies the terms according to a taxonomy. Another example signal is whether the query returns results in a list of known music search results.

The system generates a search results presentation including one or more secondary music search result links (340). The system can generate for each search result a title, a snippet, and a display link. The system can further generate secondary music search result links for a particular search result linked to a resource that has a corresponding entry in the database of music data. Each secondary music search result link can be linked to a respective music resource from which an audio or video file, for example, can be accessed.

The system provides the presentation of search results in response to the search query (350). The system can transmit the search results presentation as a document over a network to the user device for presentation on a display device by, for example, a web browser running on the user device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a search query;
   identifying a plurality of search results that satisfy the search query;
   determining that at least one search result of the plurality of search results identifies a music web page having an entry in a database of identified music web pages, wherein the database indicates, for each web page of a plurality of web pages, that the web page is a music web page from which music content can be accessed;
   in response to determining that at least one search result identifies a music web page having an entry in the database of identified music web pages, determining, from the database of identified music web pages, that the database associates the music web page with music data provided within the music web page, wherein the music data identifies one or more other music web pages;
   in response to determining that the database associates the music web page with music data provided within the music web page, generating a presentation for the plurality of search results, including generating a particular search result in the presentation having a link to the music web page and having one or more secondary music search result links for the one or more other music web pages associated with the music web page in the database of identified music web pages; and
   providing the presentation of search results including the particular search result having the one or more secondary music search result links for the one or more other music web pages associated with the music web page in the database of identified music web pages in response to the search query.

2. The method of claim 1, wherein the database of identified music web pages stores identified music web pages and one or more respective elements of associated music data for each identified music web page.

3. The method of claim 2, wherein each music web page includes markup language music data identifying one or more songs.

4. The method of claim 1, wherein each entry in the database of identified music web pages is associated with music data identifying one or more songs an artist name, an album name, or a song duration from a corresponding music web page.

5. The method of claim 1, wherein the music content is an audio resource or a video resource.

6. The method of claim 1, wherein each secondary music search result link presents a title of a song.

7. The method of claim 1, wherein generating a presentation of for the plurality of search results comprises generating secondary music result links for no more than a threshold number of search results.

8. The method of claim 1, wherein generating a particular search result in the presentation having one or more secondary music search result links to respective music web pages in the database of identified music web pages comprises determining that the query satisfies a popularity threshold.

9. The method of claim 1, further comprising determining to generate a search result having one or more secondary music search result links including determining that the query is a music query.

10. The method of claim 1, further comprising determining to generate a search result having one or more secondary music search result links including determining that a quality score for the search result satisfies a quality threshold.

11. A system comprising:
    one or more computers and one or more storage devices storing instructions that are operable, when executed by the one or more computers, to cause the one or more computers to perform operations comprising:
    receiving a search query;

identifying a plurality of search results that satisfy the search query;

determining that at least one search result of the plurality of search results identifies a music web page having an entry in a database of identified music web pages, wherein the database indicates, for each web page of a plurality of web pages entry, that the web page is a music web page from which music content can be accessed;

in response to determining that at least one search result identifies a web page that is a music web page having an entry in the database of identified music web pages, determining, from the database of identified music web pages, that the database associates the music web page with music data provided within the music web page, wherein the music data identifies one or more other music web pages;

in response to determining that the database associates the music web page with music data provided within the music web page, generating a presentation for the plurality of search results, including generating a particular search result in the presentation having a link to the web page that is a music web page and having one or more secondary music search result links representing one or more other music web pages associated with the music web page in the database of identified music web pages; and providing the presentation of search results including the particular search result having the one or more secondary music search result links for the one or more other music web pages associated with the music web page in the database of identified music web pages that were determined to be presented in response to the search query.

12. The system of claim 11, wherein the database of identified music web pages stores identified music web pages and one or more respective elements of associated music data for each identified music web page.

13. The system of claim 12, wherein each music web page includes markup language music data identifying one or more songs.

14. The system of claim 11, wherein each entry in the database of identified music web pages is associated with music data identifying one or more songs an artist name, an album name, or a song duration from a corresponding music web page.

15. The system of claim 11, wherein the music content is an audio resource or a video resource.

16. The system of claim 11, wherein each secondary music search result link presents a title of a song.

17. The system of claim 11, wherein generating a presentation of for the plurality of search results comprises generating secondary music result links for no more than a threshold number of search results.

18. The system of claim 11, wherein generating a particular search result in the presentation having one or more secondary music search result links to respective music web pages in the database of identified music web pages comprises determining that the query satisfies a popularity threshold.

19. The system of claim 11, further comprising determining to generate a search result having one or more secondary music search result links including determining that the query is a music query.

20. The system of claim 11, further comprising determining to generate a search result having one or more secondary music search result links including determining that a quality score for the search result satisfies a quality threshold.

21. A computer program product, encoded on one or more non-transitory computer storage media, comprising instructions that when executed by one or more computers cause the one or more computers to perform operations comprising:

receiving a search query;

identifying a plurality of search results that satisfy the search query, each search result representing a web page;

determining that at least one search result of the plurality of search results identifies a music web page having an entry in a database of identified music web pages, wherein the database indicates, for each web page of a plurality of web pages, that the particular web page is a music web page from which music content can be accessed;

in response to determining that at least one search result identifies a music web page having an entry in the database of identified music web pages, determining, from the database of identified music web pages, that the database associates the music web page with music data provided within the music web page, wherein the music data identifies one or more other music web pages;

in response to determining that the database associates the music web page with music data provided within the music web page, generating a presentation for the plurality of search results, including generating a particular search result in the presentation having a link to the music web page and having one or more secondary music search result links for the one or more other music web pages associated with the music web page in the database of identified music web pages; and providing the presentation of search results including the particular search result having the one or more respective secondary music search result links for the one or more other music web pages associated with the music web page in the database of identified music web pages in response to the search query.

\* \* \* \* \*